United States Patent
Whitson et al.

(10) Patent No.: US 9,113,068 B1
(45) Date of Patent: Aug. 18, 2015

(54) FACILITATING COORDINATED MEDIA AND/OR INFORMATION CAPTURING AND AGGREGATION

(71) Applicant: Camera Slice, Inc., St. Paul, MN (US)

(72) Inventors: Drew Whitson, Maplewood, MN (US); Matt Pacyga, Maplewood, MN (US); Joel Stewart, Oakdale, MN (US); Joel Vaughan, Minneapolis, MN (US); Andrew Aarestad, Minneapolis, MN (US)

(73) Assignee: Camera Slice, Inc., Mahtomedi, MN (US)

( * ) Notice: Subject to any disclaimer, the term of this patent is extended or adjusted under 35 U.S.C. 154(b) by 0 days.

(21) Appl. No.: 14/300,225

(22) Filed: Jun. 9, 2014

Related U.S. Application Data

(63) Continuation of application No. 14/120,377, filed on May 15, 2014.

(51) Int. Cl.
*H04N 5/235* (2006.01)
*H04N 5/76* (2006.01)
*H04N 5/232* (2006.01)

(52) U.S. Cl.
CPC .................. *H04N 5/23206* (2013.01)

(58) Field of Classification Search
USPC ........................................ 348/211.99–211.12
See application file for complete search history.

(56) References Cited

U.S. PATENT DOCUMENTS

| | | | | |
|---|---|---|---|---|
| 4,801,959 | A | 1/1989 | Chern | 354/266 |
| 5,281,988 | A | 1/1994 | Martin | 354/266 |
| 8,289,408 | B2 * | 10/2012 | Sako | 348/211.2 |
| 2002/0005902 | A1 * | 1/2002 | Yuen | 348/211 |
| 2004/0183915 | A1 * | 9/2004 | Gotohda et al. | 348/207.11 |
| 2006/0028558 | A1 * | 2/2006 | Sato et al. | 348/211.99 |
| 2011/0181729 | A1 * | 7/2011 | Lee | 348/159 |
| 2013/0093904 | A1 | 4/2013 | Wagner | 348/207 |

OTHER PUBLICATIONS

Phone Control Free—Android Apps on Google Play, URL: http://play.google.com/store/apps/details?id=alex.ward.phone.control.free, Retrieved on Apr. 18, 2014.
GoPro Wi-Fi BacPac & Remote, URL: gopro.com/camera-accessories/wi-fi-bacpac-remote-combo retrieved on Apr. 18, 2014.
Remotely Control a Second iPhone or iPad Camera with Blux Lens URL: http://www.cultofmac.com/219263/remotely-control-a-second-iphone-or . . . Retrieved on Apr. 19, 2014.

* cited by examiner

*Primary Examiner* — Tuan Ho
*Assistant Examiner* — Selam Gebriel

(57) ABSTRACT

A system and method for facilitating coordinated media and/or information capturing and aggregation are disclosed. A set of portable media capture devices may be determined for the coordinated media capture. Capture requests configured to start capture functionality on this set of portable media capture devices in coordination with each other may be determined and transmitted to the portable media capture devices. Media and/or information may be captured by the portable media capture devices in accordance with the capture requests. The captured media and/or information may be accessed by users of the portable media capture devices in an aggregated format. The aggregated format may include a panoramic, three dimensional, motion, a corroborated view, a collage, a blend, and/or any other aggregated format(s).

28 Claims, 9 Drawing Sheets

Aggregating the captured media to form
a panoramic view

Aggregating the captured media to form
a collage

FACILITATING COORDINATED MEDIA AND/OR INFORMATION CAPTURING AND AGGREGATION

FIELD OF THE DISCLOSURE

This disclosure relates to coordinated media and/or information capturing and aggregation.

BACKGROUND

Remote control devices for controlling a camera's shutter are generally known in the art. Some remote control devices are capable of controlling multiple cameras to take pictures at the same time. Apps enabling a smartphone to control another smartphone's camera are also generally known in the art. Those apps typically allow a user to control a remote smartphone's camera to snap a picture using a local smartphone.

SUMMARY

One aspect of the disclosure relates to facilitating coordinated media and/or information capturing and aggregation. This may foster social connections between users. For achieving this, capture requests may be determined by and transmitted from a control unit such as a mobile device, a computer, a server and/or any other type(s) of controls unit(s) to portable media capture devices. Capture requests may be configured to start media-capturing-functionality and/or information-capturing-functionality on a corresponding portable media capture device in coordination with other portable media capture devices. For example, without limitation, capture requests may be transmitted to a set of portable media capture devices in proximity to each other to facilitate a group picture. In that example, one of the capture requests may be configured to start image capturing on a corresponding portable media capture device at a specific time. The media and/or information captured by the portable media capture device may be transmitted back to the control unit for aggregation with media captured by other portable media capture devices in accordance with the capture requests. The format of aggregation may vary. For example, without limitation, the captured media may be aggregated to form a panoramic view, a 3D view, a motion view, a collage view, views for implementing augmented reality and/or any other types of view. In some implementations, for the aggregation, the capture media and/or information may be processed, for example, for facial recognition, eye color determination, time of day determination, number of people in the shot determination, and/or any other type(s) of feature determination. In some implementations, the aggregate captured media and/or information may be processed, for example, for print (e.g., on special wide printed material), projections, for display on more than one displays and/or any other presentation purposes. In some implementations, the aggregated captured media and/or information may be processed for searchable logos, colors, time of day, and/or any other extractable features of the media to facilitate information mining on the aggregated captured media.

In some implementations, the aggregated media and/or information may be provided to be accessed by users from individual portable media capture devices. In some examples, a user interface associated with the control unit may be provided to the user for controlling various aspects of the coordinated media capturing and aggregation. For example, without limitation, the user may be enabled so as to select which portable media capture devices to take part in the coordinated media capturing, configure specific capturing functionality provided by the selected portable media capture devices for coordinated capturing, configure capture requests on an individual level and/or group level, arrange aggregation of the captured media, and/or any other operations. This may enhance the conventional remote media capturing methods and devices by incorporating social elements and by incorporating various configurable coordination and aggregation elements.

A system configured to facilitate coordinated media capturing and aggregation may include one or more control units. The one or more control units may operate in a client/server architecture with one or more portable media capture devices. The portable media capture devices may be associated with users. One or more control units may be configured to execute one or more of the following: a device determination component, a capture request component, a user interface component, a device communication component, a media aggregation component, a aggregated media access component, and/or any other components.

A device determination component may be configured to determine which of one or more portable media capture devices may be included in a set to capture media in coordination with each other. This may involve communicating with individual portable media capture devices, acquiring a status regarding the individual portable media capture devices, determining whether the individual portable media capture devices may be included for the coordinated media capturing, and/or any other operations. The communication with the individual portable media capture devices may be initiated by the device determination component and/or may be initiated by the individual portable media capture devices. Through the communication with the individual portable media capture devices, the control unit via the device determination component may acquire a status regarding the portable media capture devices. The acquired status may include information indicating a position and/or a location of the individual portable media capture devices, one or more operable media capturing functionality provided by the individual portable media capture devices, a battery level, an operation level, and/or any other information. Based on such information in the acquired status, the device determination component may determine whether the individual portable media capture devices may be included for coordinated media capturing. In some implementations, the device determination component may be configured to determine the portable media capture devices to be included in a set for coordinated media capturing by obtaining the device information from users associated with the control unit. A user interface, e.g., provided by the user interface component described herein, may enable a user to provide the device information to the device determination component in those implementations.

Capture request component may be configured to determine capture requests for transmission to the individual portable media capture devices as determined by the device determination component. The capture requests determined by the capture request component may be used by the individual portable media capture devices to start capturing media in coordination with each other. An individual capture request may comprise configuration information instructing a corresponding portable media capture device to start capturing media in coordination with other portable media capture devices. In some implementations, the configuration information in the individual capture request may indicate various configuration of the media capture functionality provided by the corresponding portable media capture device. For example, in some implementations, the capture requests determined by the capture request component may specify that the portable media capture devices should start the media capturing at the same time. In some implementations, the capture requests determined by the capture request component may specify that the portable media capture devices should start the portable media capture devices sequentially or quasi-sequentially. In some implementations, the coordinated media capture facilitated by the capture requests determined by the capture request component may facilitate location coordination of the media capture. The capture request component may be configured to effectuate transmission of the capture requests to the portable media capture devices over a wireless link after the determination of the capture requests. In some implementations, the capture requests determined by the capture request component may request to the individual portable media capture devices to capture information in fashion(s) similar to capture media.

The user interface component may be configured to provide graphical user interfaces to the user(s) of the system. Providing user interface by the user interface component may include generating information for implementing the graphical user interfaces on a display. The graphical user interfaces provided by the user interface component may include various field controls, such as buttons, input boxes, selection menus, check boxes, and/or any other field controls enabling the user(s) to provide inputs. In some implementations, the graphical user interfaces provided by the user interface component may include one or more graphical user interfaces enabling the user(s) of the system to select which portable media capture devices to be included for coordinated media capturing, may include one or more graphical user interfaces enabling the user(s) of the system to configure media capture functionality portable media capture devices for coordinated capture, may include one or more graphical user interfaces enabling the user(s) of the system to notify users associated with the portable media capture devices to prepare for media capture in coordination with each other, may include one or more graphical user interfaces enabling the user(s) of the system to add annotation to be associated with the coordinated capture; and/or may include any other graphical user interfaces.

The device communication component may be configured to facilitate communications between the control unit and the individual portable media capture devices. This may involve establishing communication channels between the control unit and the individual portable media capture devices, exchanging control messages for ensuring the communication, exchanging payload information for the actual communication (e.g., the payload information may include capture requests, notifications and/or any other information from the control unit), confirming receipt of specific information, augmenting the communication with security, and/or any other operations. Some or all portion of the communication between the control unit and the portable media capture devices may be via a wireless link or wireless links. The wireless link may include a RF link, a near field communication link (NFC), a Bluetooth link (including BLE), an iBeacons link, a cellular network, a WIFI network, and/or any other type(s) of wireless link(s).

The media aggregation component may be configured to receive media from the portable media capture devices. Media received by the media aggregation component may be captured by a portable media capture device in accordance with a capture request. In some implementations, the captured media may be received from individual portable media capture devices directly via a wireless link. In some other implementations, the captured media may be received by the media aggregation component from a network location, e.g., such as a server. In some implementations, receiving the captured media by the media aggregation component may involve determining whether the media requested by the capture requests are received from the corresponding portable media capture devices, polling individual portable media capture devices if the media has not been captured, and/or any other operations. In some implementations, the media aggregation component may be configured to receive captured information from the individual portable media capture devices in fashions similar to receiving the captured media from the portable media capture devices.

After receiving the captured media from the individual portable media capture devices, the media aggregation component may be configured to effectuate aggregation of the received captured media. For a set of media captured by portable media capture devices in accordance with capture requests, the media aggregation component may effectuate aggregation of the set of the captured media such that the set of captured media may be accessed by users in an aggregated format. The aggregation effectuated by the media aggregation component may involve registering, calibrating, blending, and/or any other transform processes. Examples of the aggregated format at the end of these processes may include a panoramic view (horizontal or vertical), a fisheye view (including a hemispheric fisheye view), a one-shot lenses view, or any other wide view of a real-world field through the aggregated images and/or video. Other examples of the aggregated format that may be achieved by the media aggregation component may include a motion view, a 3D view, views for implementing Augmented Reality and/or any other type(s) of view(s).

In various implementations, the aggregation effectuated by the media aggregation component may be just about any type of media aggregation desired. For example, in one implementation, the aggregation effectuated by the media aggregation component may involve aggregating the captured media side by side to form a comparison. In another implementation, pictures taken in coordination with each other in accordance with capture requests may be simply put together randomly to form a collage. In still another implementation, audio clips recorded by individual recording devices at different locations may be aggregated as if the speeches and/or sounds were taking place at the same time and in the same space. In some implementations, aggregation of the media captured in accordance with capture requests may be configured by the user(s) of the system. In some implementations, users may be enabled to arrange the aggregation of the captured media by specifying positions of the captured media in the aggregated format.

In some implementations, the media aggregation component may be configured to effectuate processing of the aggregated captured media for feature determination, extraction, information mining, media presentation, and/or any other purposes. In some implementations, the media aggregation component may be configured to effectuate aggregation of captured information in similar fashion(s) to effectuating aggregation of captured media.

The aggregated media access component may be configured to facilitate access to the aggregated captured media. The access facilitated by the aggregated media access component may be on the portable media capture devices that captured the individual media in the aggregated format. This may facilitate a sense of social connection between users as they may feel they have contributed to the aggregated captured media through such access. Facilitating such access by the aggregated media access component may involve making the aggregated captured media available to the portable media capture devices via a wireless link and/or a wired link. In some implementations, the aggregated media access component may be configured to receive information regarding user access of the aggregated capture media.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
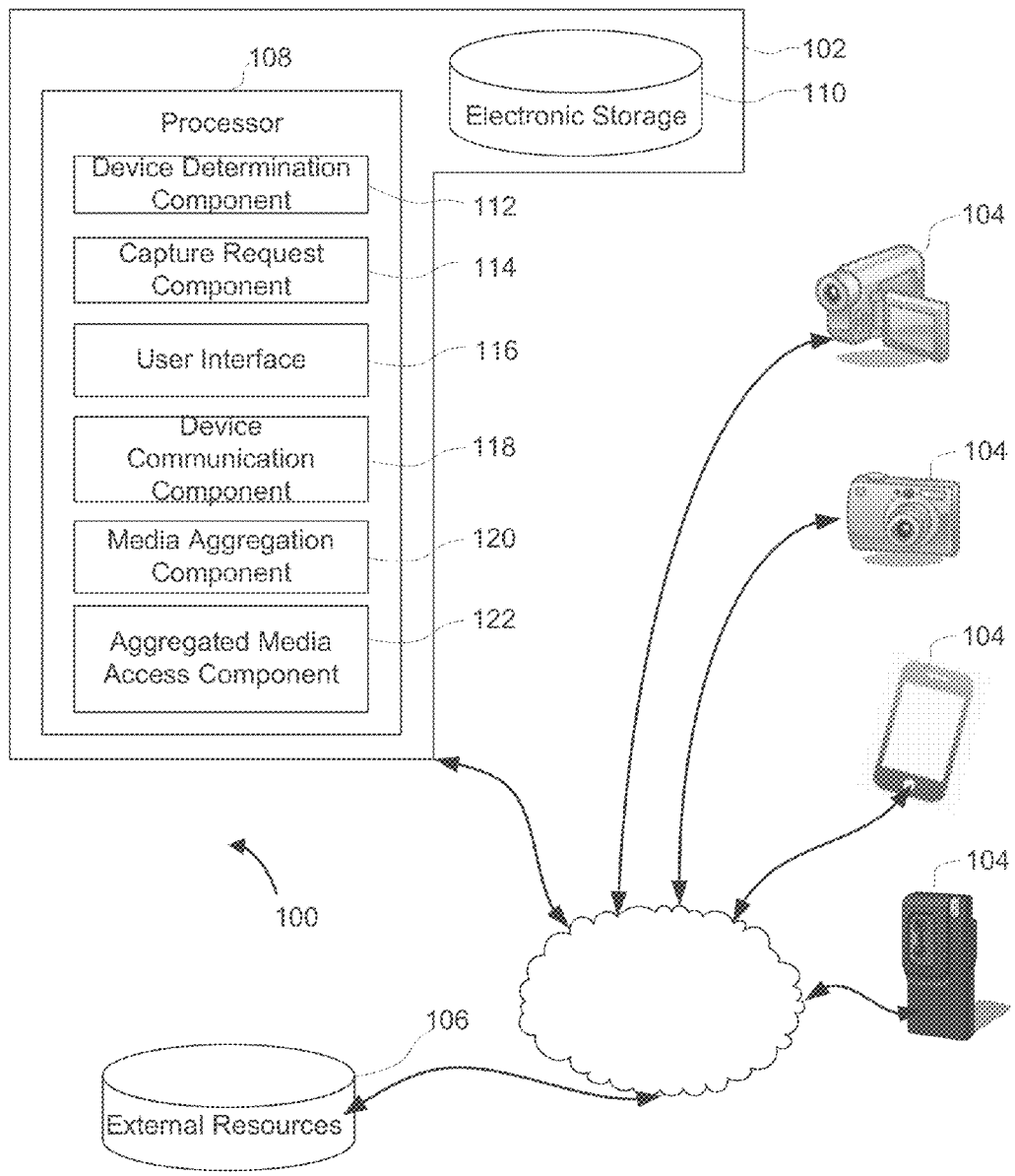
FIG. 1 illustrates one example of a system configured for facilitating coordinated media capture and aggregation in accordance with the disclosure.

FIG. 1 illustrates a system 100 for facilitating coordinated media capture and aggregation. In some implementations, as shown in this example, system 100 may include one or more of a control unit 102 configured for facilitating coordinated media capture and aggregation. Examples of the control unit 102 may include, but are not limited to, a smartphone, a feature phone, a tablet, a netbook, a laptop, a desktop computer, a server, a dedicated mobile device having processing power, a camera, a camcorder, an audio recorder and/or any other type(s) of devices or apparatus. Control unit 102 may be configured to communicate with portable media capture devices 104 via a network. A given portable media capture device 104 may comprise one or more media capture functionality for capturing still image, video, audio, and/or any other type(s) of media. The given portable media capture device 104 may comprise information capture functionality for capturing various information such as weather information, stock information, geolocation information, time stamp information, IP address information, social profile information regarding users associated with the portable media capture devices 104, news, multiple feeds from external resources and/or any other type(s) of information. Examples of the given portable media capture device may include, but not limited to, a mobile phone, a tablet, a netbook, a laptop, a camera, a camcorder, an audio recorder, and/or any other type of portable devices having one or more media capture functionality. Some or all of the network via which the control unit 102 may communicate with the portable media capture device 104 may include a radio frequency (RF) link, a near field communication link (NFC), a Bluetooth link (including BLE), a iBeacons link, a cellular network, a WIFI network, a WIFI hotspot, and/or any other type(s) of wireless link(s).

As shown, control unit 102 may include processors 108 configured to execute computer-readable instructions to implement system components. The computer program components may include one or more of a device determination component 112, a capture request component 114, a user interface component 116, a device communication component 118, a media aggregation component 120, an aggregated media access component 122, and/or any other components.

The device determination component 112 may be configured to determine one or more portable media capture devices 104 which may be included in a set for capturing media in coordination with each other. Such determination by the device determination component 112 may involve communicating with individual portable media capture devices 104, acquiring a status regarding the individual portable media capture devices 104, determining whether the individual portable media capture device 104 may be included for coordinated media capturing, and/or any other operations. The device determination component 112 may communicate with the individual portable media capture devices 104 via the device communication component 118. As will be discussed in detail with device communication component 118, the communication with the individual portable media capture devices 104 may be initiated by the device determination component 112 and/or may be initiated by the individual portable media capture devices 104. For example, without limitation, the device determination component 112 may be configured to communicate periodically with any portable media capture device in proximity to the control unit 102. In one implementation, without limitation, the control unit 102 includes a smartphone and may be configured to perform a handshake with any portable media capture device 104 in proximity to the smartphone via a Bluetooth link. In another example, the control unit 102 includes a server and may be configured to perform a handshake with a registered portable media capture device 104 via a WIFI network or a cellular network. In some examples, the device determination component 112 may be configured to receive handshake request from the individual portable media capture devices 104 via the Bluetooth link, the WIFI network, the cellular network, and/or any other type(s) of wireless links.

Through the communication with individual portable media capture devices 104, the control unit 102 via the device determination component 112 may acquire a status regarding the portable media capture devices 104. The acquired status may include information indicating a position (e.g., longitude, latitude, orientation, and/or any other types of position) and/or a location (e.g., a real-world location of a place) of the individual portable media capture devices 104, one or more media capturing functionality provided by the individual portable media capture devices 104, a battery level, operation level (e.g., busy on a phone call), and/or any other information. Based on such information in the acquired status, the device determination component 112 may determine whether the individual portable media capture devices 104 may be included in a set for coordinated media capturing. For example, without limitation, the device determination component 112 may determine that the individual portable media capture devices may be included in such a set based on a position of the portable media capture devices 104. For instance, in one implementation, a radius limit (e.g., 50 meter) may be configured into the device determination component 112 such that portable media capture devices 104 within the radius limit from the control unit 102 may be included in such a set. As another example, not intended to be limiting, the device determination component 112 may determine the individual portable media capture devices 104 which may be included in such a set based on a battery level of the portable media capture devices 104. For instance, in one implementation, a battery level threshold (e.g., at least 20% battery) may be configured into the device determination component 112 such that portable media capture devices 104 having battery power above the threshold may be included in such a set. Other examples for determining which portable media capture devices 104 may be included in the set for coordinate media capturing are contemplated.

In some implementations, the device determination component 112 may be configured to determine the portable media capture devices 104 for inclusion in a set for coordinated media capturing by obtaining the device information from users associated with the control unit 102. A user interface, e.g., provided by the user interface component 116 described herein, may enable a user to provide the device information to the device determination component 112. For example, through the interface, a given user associated with the control unit 102 may provide device information such as usernames associated with the portable media capture devices 104, names of those devices, Internet addresses of those devices, and/or any other device information to the device determination component 112 so that the device determination component 112 may include those devices in the set for coordinated media capturing. In some implementations, the given user may obtain the device information from the users associated with the portable media capture devices 104. For example, without limitation, in the case where a set of portable media capture devices 104 are determined by the device determination component 112 to be in proximity to the given user, the given user may broadcast a message (e.g., via the user interface component 116 described herein) to the users of the portable media capture devices 104; in the message, the given user may solicit those users to accept a coordinated media capture request; and the message may include an "accept request" control such that the users associated with the portable media capture devices 104 may accept the capture requests and provide the device information to the given user. Other examples are contemplated.

Capture request component 114 may be configured to determine capture requests for transmission to the individual portable media capture devices 104 in the set determined by the device determination component 112. The capture requests determined by the capture request component 114 may be used by the individual portable media capture devices 104 to start capturing media in coordination with each other. Determining capture requests may involve determining the configuration of the capture requests. A given capture request determined by the capture request component 114 may include configuration information specifying various aspects regarding the coordinated media capture.

Figure 2:
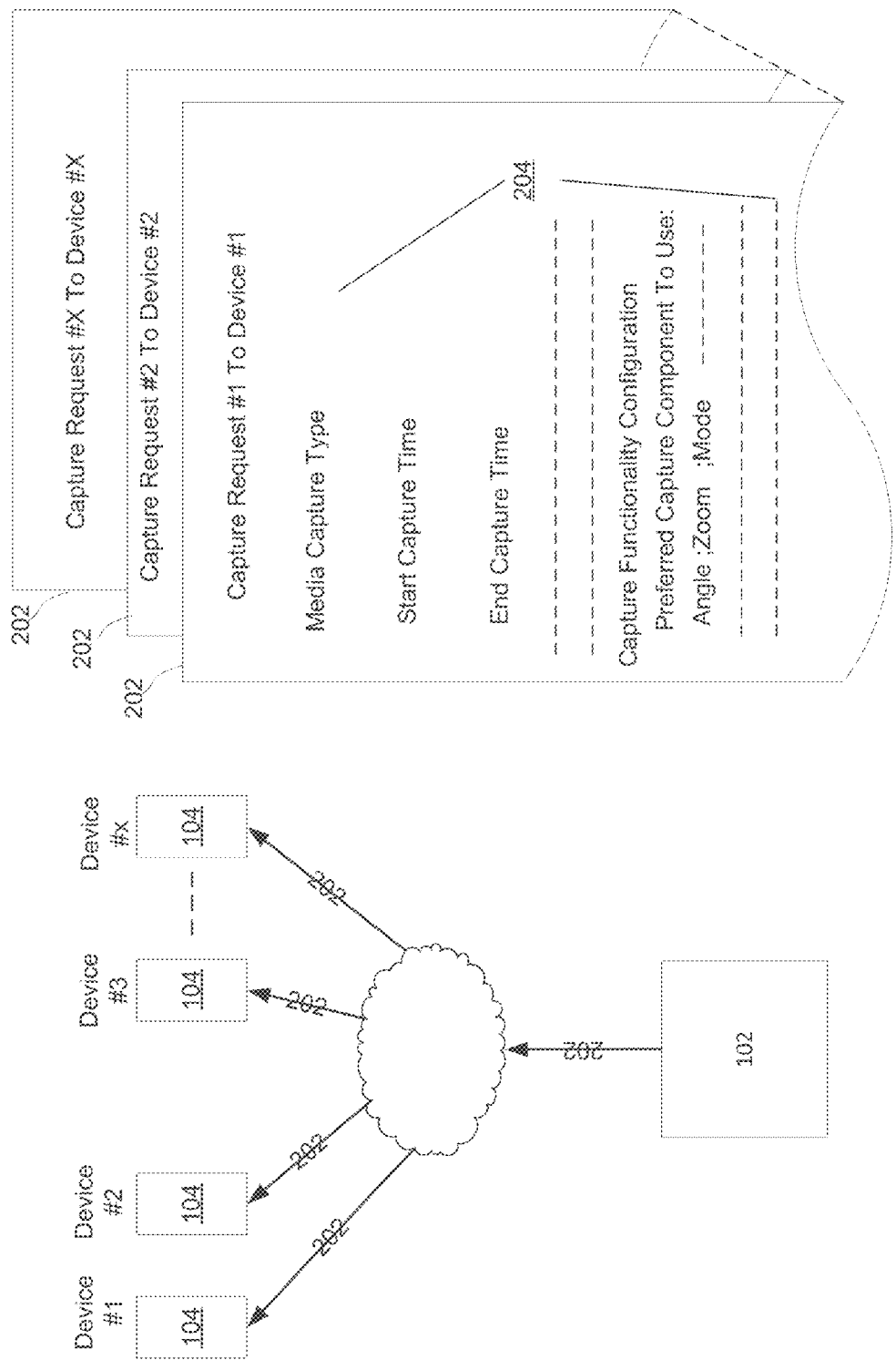
FIG. 2 illustrates one example of capture requests determined by the system shown in FIG. 1.

FIG. 2 illustrates one example of capture requests determined by the system shown in FIG. 1. It will be described with reference to FIG. 1. As shown in FIG. 2, individual capture requests 202 may be determined by the control unit 102 shown in FIG. 1 and transmitted to the portable media capture devices 104 via communication links, such as, but not limited to, a Bluetooth link, a cellular network, a WIFI network, and/or any other type(s) of communication link(s). As illustrated in FIG. 2, an individual capture request 202 may comprise configuration information 204 instructing a corresponding portable media capture device 104 (e.g., device #1, #2, #3, or #X as shown) to start capturing media in coordination with each other. In this example, as shown, the configuration information 204 may indicate various aspects regarding the coordinated media capture. For instance, as shown, the media capture type information may be included in the capture request 202 to indicate one or more types of media to be captured. Examples of the media that may be captured may include, but not limited to, still image, video, audio, and/or any other type(s) of media.

As also shown in FIG. 2, the configuration information 204 may include information indicating one or more start time and/or end times for the portable media capture device 104 to capture media in coordination with other portable media capture devices. As still shown, the configuration information 204 may include information indicating various aspects about the capture functionality provided by the corresponding portable media capture device 104 desired by the control unit 102. For example, as shown, the configuration information 204 may indicate one or more capture components to be used by the corresponding portable media capture device 104. For instance, in case where the corresponding portable media capture device 104 may have multiple image sensors (e.g., a front camera and a back camera), the configuration information 204 may indicate which image sensor(s) to use for the coordinated media capturing requested. As also can be seen from FIG. 2, the configuration information 204 may indicate various configuration of the media capture functionality provided by the corresponding portable media capture device 104. For example, the capture request 202 may specify a zoom level, a focus object or person, an angle from which the media should be captured, a quality of the media to be captured (e.g., image or video resolution, sound quality and/or any other types of qualities for the captured media), a frame rate, a gain control limit, an exposure level, a white balance level, an image effect or image effects to be used, an audio recording level, a sound level, an audio mix, a mix balance, and/or any other adjustable aspects of the media capture functionality provided by the corresponding portable media capture device 104. Still as another example, the capture request 202 may specify a quantity of media to be captured by the corresponding portable media capture device 104. For instance, the capture request 202 may specify that three images are to be captured by a smartphone within a period of time.

It should be understood the configuration information 204 described in FIG. 2 is only for illustration. Other examples of configuration information 204 that may be included in a capture request are contemplated. For example, in some implementations, the configuration information 204 may include information indicating a location or a list of locations where the coordinated media capture requested by the control unit 102 may take place such that the media capture of the corresponding portable media capture device 104 will only start at that location or those locations. As another example, the configuration information 204 may include information indicating a location identifier (e.g., a network address, a cellular phone number, a server name, a phone name, and/or any other type(s) of identifier(s) that may be used to identify a location) to which the portable media capture devices 104 should send the captured media.

It is noted that the capture request determined by the capture request component 114 may not necessarily limited to requesting the portable media capture device 104 to capture media. In some implementations, capture requests requesting the portable media capture devices 104 to capture information may be determined by the capture request component 114. The requested information to be captured may include weather information, stock information, geolocation information, time stamp information, IP address information, social profile information regarding users associated with the portable media capture devices 104, news, multiple feeds from external resources and/or any other type(s) of information. For example, as an illustration, a given portable media capture device 104 may comprise one or more sensors for determining a temperature of an environment where the portable media capture device 104 is in. In that example, capture requests may be determined by capture request component 114 to request the individual portable media capture devices 104 to determine the temperature in the corresponding environment in coordination with other portable media capture devices 104. For instance, the capture requests in that example may specify the portable media capture devices should determine, through its temperature sensors, the temperature of the corresponding environment at a specific time simultaneously. Other examples of coordinated information capture requests are contemplated.

Returning to FIG. 1, the capture request component 114 may be configured to start media capture functionality on the set of portable media capture devices 104 in coordination with each other. The capture request component 114 may achieve this in a number of ways. For example, the capture requests determined by the capture request component 114 may specify that the set of portable media capture devices 104 should start the media capturing at the same time. This may facilitate simultaneous capture by the set of portable media capture devices 104.

Figure 3:
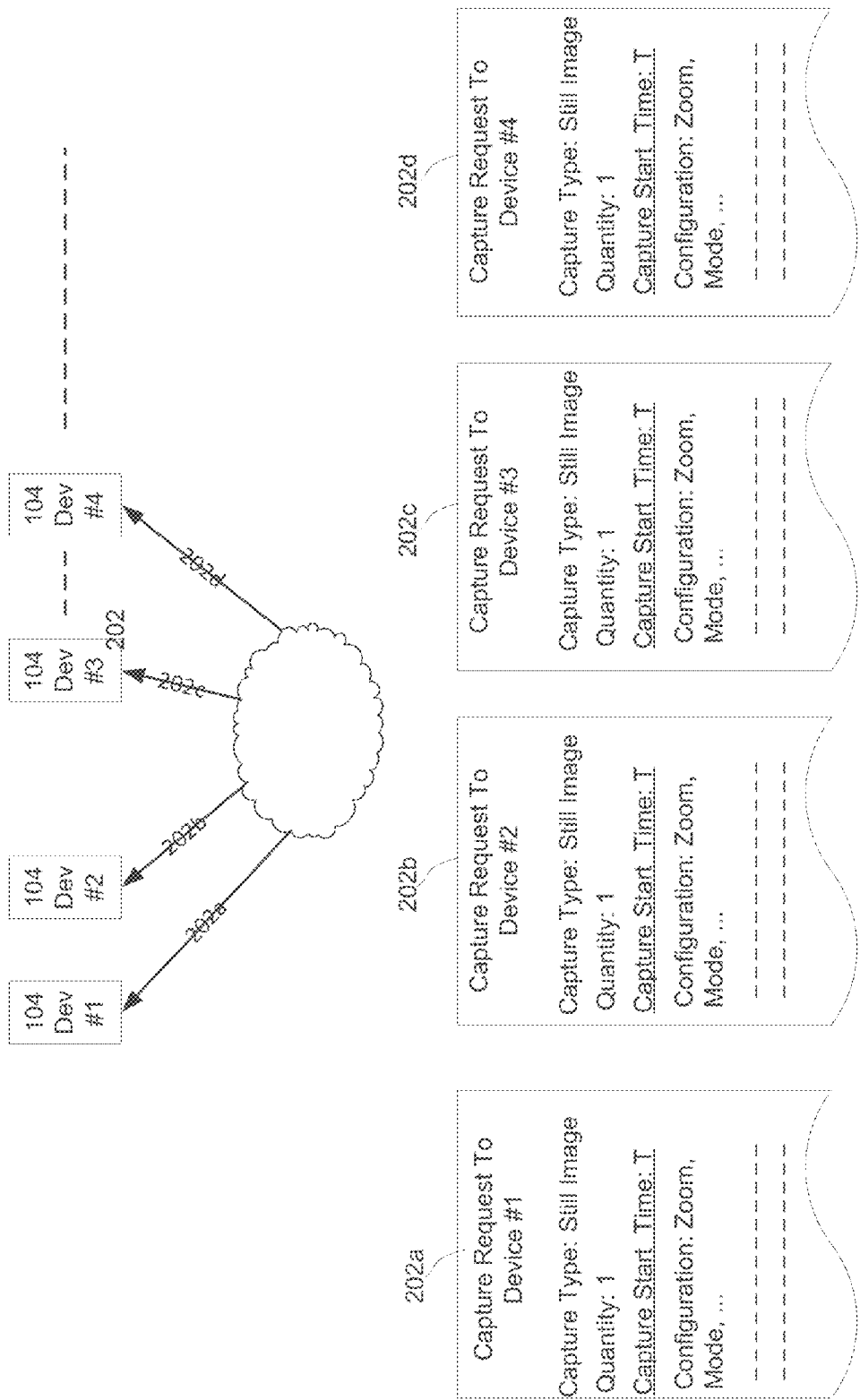
FIG. 3 illustrates one example of capture requests facilitating simultaneous media capture by the portable media capture devices shown in FIGS. 1 and 2.

FIG. 3 illustrates one example of capture requests facilitating simultaneous media capture by the portable media capture devices shown in FIGS. 1 and 2. It will be described with reference to FIGS. 1 and 2. As can be seen in FIG. 2, the individual portable media capture devices 104 may receive capture requests 202 for coordinated media capture. As shown in this example, the individual capture requests, such as 202a, 202b, 202c, and 202d shown, may correspond to the individual portable media capture devices 104. In this example, as shown, the individual capture requests specify that the corresponding portable media capture device 104 should all capture one still image at time T. In this way, a group picture showing a view or views of one or more real-world fields at time T may be facilitated.

Figure 4:
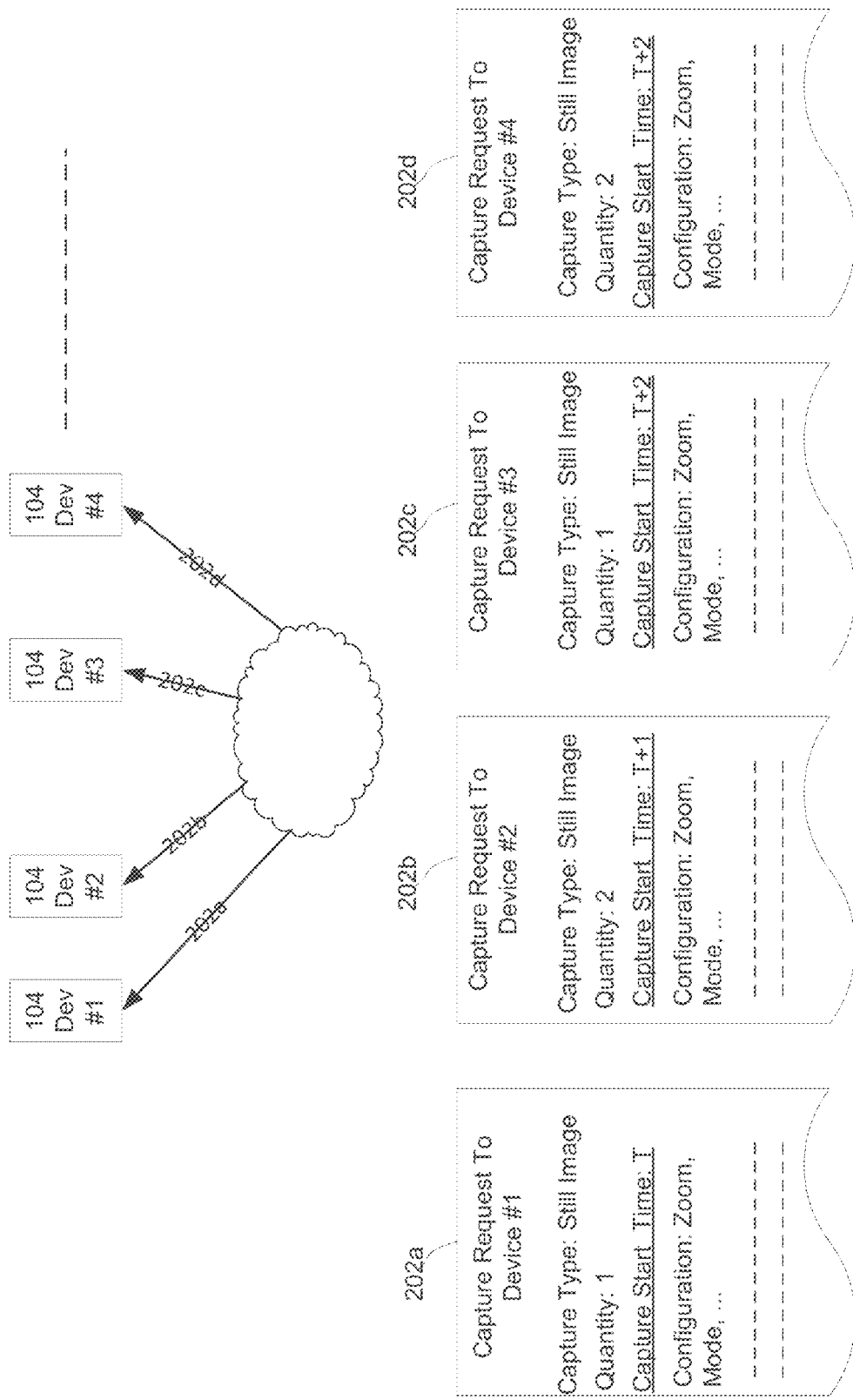
FIG. 4 illustrates one example of capture requests facilitating sequential media capture by the portable media capture devices shown in FIGS. 1 and 2.

In some implementations, the capture requests determined by the capture request component 114 may specify that the set of portable media capture devices 104 should start the portable media capture devices 104 sequentially or quasi-sequentially. FIG. 4 illustrates one example of capture requests facilitating sequential media capture by the portable media capture devices shown in FIGS. 1 and 2. It will be described with reference to FIGS. 1 and 2. As can be seen in FIG. 2, the individual portable media capture devices 104 may receive capture requests 202 for coordinated media capture. As shown in this example, the individual capture requests, such as 202a, 202b, 202c, and 202d shown, may correspond to the individual portable media capture devices 104. In this example, as shown, the individual capture requests specify that the portable media capture device #1 should capture a still image at time T, the portable media capture device #2 should capture 2 still images at time T+1, and the portable media capture devices #3 and #4 should capture 1 still image and 2 still images, respectively, at time T+2. In this way, a group picture showing a view or views of one or more real-world fields sequentially starting at time T may be facilitated.

It should be appreciated that the coordinated media capture facilitated by the capture requests determined by the capture request component 114 may not be limited to timing coordination such as the examples described in FIGS. 3 and 4. In some implementations, the coordinated media capture facilitated by the capture requests determined by the capture request component 114 may facilitate location coordination. For example, without limitation, the capture requests may specify a location or a list of locations where the corresponding portable media capture devices 104 should start the media capture. Such coordinated media capture based on location may facilitate group views of different real-world fields or sounds as desired.

In some implementations, coordinated information capture may be facilitated similarly to the coordinated media capture described herein. The facilitated coordinated information capture may include coordinated capture of weather information, stock information, geolocation information, time stamp information, IP address information, social profile information regarding users associated with the portable media capture devices 104, news, multiple feeds from external resources and/or any other type(s) of information.

Returning to FIG. 1, the capture request component 114 may be configured to effectuate transmission of the capture requests to the portable media capture devices 104 via a wireless link after the determination of the capture requests, such as the capture requests 202 shown FIGS. 2-4. The wireless link may include a RF link, a near field communication link (NFC), a Bluetooth link (including BLE), an iBeacons link, a cellular network, a WIFI network, a WIFI hotspot and/or any other type(s) of wireless network(s). The capture request component 114 may achieve this by employing the device communication component 118 to communicate with portable media capture devices 104. In some implementations, effectuating transmission of the capture requests by the capture request component 114 may include performing a handshake with the "target" individual portable media capture devices 104 to ensure the capture requests are received by the "target" portable media capture devices 104. In some implementations, the capture request component 114 may effectuate the transmission of the capture requests periodically until a confirmation is received from the "target" portable media capture devices 104 confirming that the capture requests have been received by the "target" portable media capture devices 104. In some implementations, effectuating transmission of the capture requests by the capture request component 114 may involve determining timing of the transmission. For example, the capture request component 114 may determine to effectuate transmission of the capture requests at different times based on a status of the portable media capture devices 104. For instance, in one implementation, the transmission of the capture request may be effectuated by the capture request component 114 only after the "target" portable media capture device 104 indicates it is ready (e.g., not in a busy mode) to start media capturing. In that implementation, the capture request component 114 may poll such status information from the individual portable media capture devices 104 periodically.

The user interface component 116 may be configured to provide graphical user interfaces to the user(s) of the system 100. Providing user interface by the user interface component 116 may include generating information for implementing the graphical user interfaces on a display (not depicted in this example). The graphical user interfaces provided by the user interface component 116 may include various filed controls, such as buttons, input boxes, selection menus, check boxes, and/or any other field controls enabling the user(s) to provide inputs.

In some implementations, the graphical user interfaces provided by the user interface component 116 may include one or more graphical user interfaces enabling the user(s) of the system 100 to select which portable media capture devices to be included in a set for coordinated media capture devices. As discussed above, the device determination component 112 may provide a list of portable media capture devices that may be included in such a set. In those implementations, this list may be presented to the user in one or more graphical user interfaces provided by the user interface component 116 for selection. As an illustration, not intended to be limiting, the device determination component 112 may provide a list of portable media capture devices 104 that are in proximity to the control unit 102 via Bluetooth link; this list of portable media capture devices may then be presented to the user(s) of the system 100 for selection; the selected devices may be obtained by the device determination component 112 and capture requests for the selected devices may be determined and transmitted as discussed above.

Figure 5:
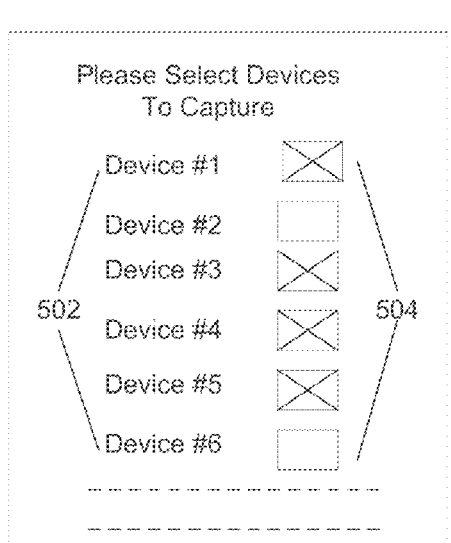
FIG. 5 illustrates one example of a device selection user interface configured to enable a user to select which portable media capture devices to be included in a set for coordinated media capture.

FIG. 5 illustrates one example of a device selection user interface 500 configured to enable a user to select which portable media capture devices to be included in a set for coordinated media capture. The device selection user interface 500 may be provided by a system similar to or the same as system 100 (shown in FIG. 1 and described herein). As can be seen in FIG. 5, device selection user interface 500 may present information 502 indicating a list of portable media capture devices that are available for coordinated media capture. A given portable media capture device in that list may be selected by the user(s), for example through a check box 504 corresponding to the given portable media capture device.

Returning to FIG. 1, in some implementations, the graphical user interfaces provided by the user interface component 116 may include one or more graphical user interfaces enabling the user(s) of the system 100 to configure media capture functionality of portable media capture devices for coordinated capture. The configuration enabled by such graphical user interfaces provided by the user interface component 116 may be on an individual device level such that media capture functionality of an individual portable media capture device may be configured and/or may be on an group level such that the common media capture functionality of a group of portable media capture devices may be configured for coordinated media capture. Any aspects of the media capture functionality of the portable media capture devices may be configured through such graphical user interfaces. Examples of configurable aspects of the media capture functionality of a given portable media capture device may include a zoom level, a focus object or person, an angle from which the media should be captured, a quality of the media to be captured (e.g., image or video resolution, sound quality and/or any other types of qualities for the captured media), a frame rate, a gain control limit, an exposure level, a white balance level, an image effect or image effects to be used, an audio recording level, a sound level, an audio mix, a mix balance, and/or any other adjustable aspects of the media capture functionality provided by the given portable media capture device. As described above, adjustment to such aspects made by the user(s) of the system 100 may be included in the capture requests determined by the capture request component 114 and transmitted to the portable media capture devices.

Figure 6:
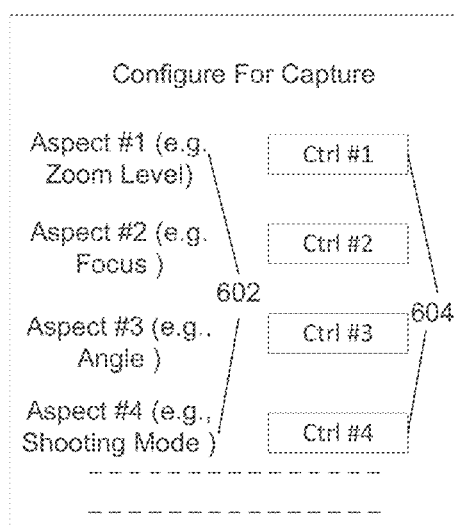
FIG. 6 illustrates one example of a device configuration user interface configured to enable a user to adjust one or more aspects of capture functionality on a portable media capture device.

FIG. 6 illustrates one example of a device configuration user interface 600 configured to enable a user to adjust one or more aspects of capture functionality of a portable media capture device. The device configuration user interface 600 may be provided by a system similar to or the same as system 100 (shown in FIG. 1 and described herein). As can be seen in FIG. 6, the device configuration user interface 600 may present information 602 indicating a list of adjustable aspects of capture functionality of an individual portable media capture device or a group of portable media capture devices. A given adjustable aspect of the media functionality may be configured by the user(s), for example through an appropriate control 604 that may adjust the given aspect. By way of non-limiting example, a dial modal may be provided in the device configuration user interface 600 for adjusting a zoom level, an input box may be provided for providing a desired capture angle, a selection menu may be provided for selecting a desired shooting mode, and/or any other types(s) of control(s) 604 may be provided.

Returning to FIG. 1, in some implementations, the graphical user interfaces provided by the user interface component 116 may include one or more graphical user interfaces enabling the user(s) of the system 100 to notify users associated with the portable media capture devices to prepare for media capture in coordination with each other. The notification enabled by such graphical user interfaces may be transmitted to the users on a group level or on an individual level. The notification may include information indicating to the users that coordinated media capture is planned. In some implementations, the notification may include field controls allowing those users to accept coordinated media capture request such that the portable media capture devices associated with those users may be included in the set for the coordinated media capture.

Figure 7:
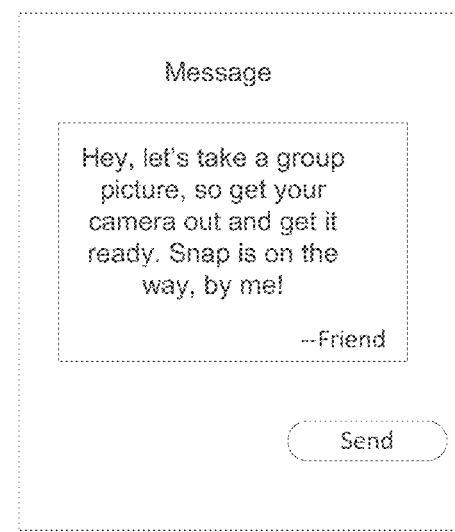
FIG. 7 illustrates one example of a message user interface configured to enable a user to send a notification to other users associated with portable media capture devices.

FIG. 7 illustrates one example of a message user interface 700 configured to enable a user to send a notification to other users associated with portable media capture devices. The message user interface 700 may be provided by a system similar to or the same as system 100 (shown in FIG. 1 and described herein). As can be seen in FIG. 7, a user of the control unit 102, e.g., a friend, may compose a message notifying other uses that he/she would like to coordinate a group picture using their cameras and that he/she would like control of the snapping. As an illustration, not intended to be limiting, such a message may be sent to those users while they congregate in an environment, such as, but not limited to, a room, a restaurant, a park, an activity, a field, and/or any other type(s) of environment. Such a message may be transmitted to the portable media capture devices via any suitable notification medium, such as, but not limited to, push notification, electronic mail (e-mail), audio notification, visual notification, and/or any other notification medium.

Figure 8:
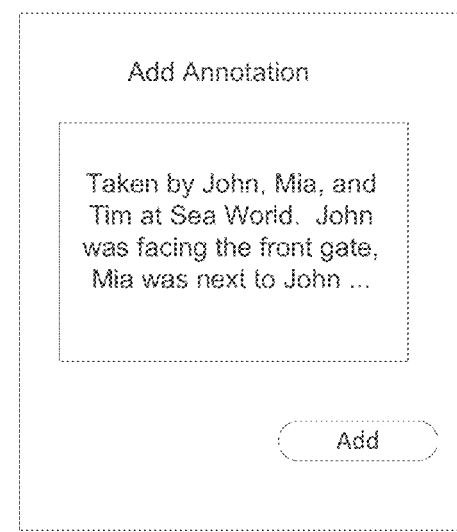
FIG. 8 illustrates one example of an annotation user interface configured to enable a user to add annotation to be associated with the coordinated media capture.

Returning to FIG. 1, in some implementations, the graphical user interfaces provided by the user interface component 116 may include one or more graphical user interfaces enabling the user(s) of the system 100 to add annotation to be associated with the coordinated capture. This may allow the user to describe circumstances in which the coordinated media capture takes place. For example, without limitation, the annotation may allow the user to describe where the coordinated capture took place, who took part in the coordinated capture (e.g., the users associated with the portable media capture devices for the coordinated capture), how the coordinated capture was arranged, and/or any other description to be associated with the coordinated capture. FIG. 8 illustrates one example of an annotation user interface 800 configured to enable a user to add annotation to be associated with coordinated media capture.

Returning to FIG. 1, the device communication component 118 may be configured to facilitate communications between the control unit 102 and the individual portable media capture devices 104. This may involve establishing communication channels between the control unit 102 and the individual portable media capture devices 104, exchanging control messages for ensuring the communication, exchanging payload information for the actual communication (e.g., the payload information may include capture requests, notifications and/or any other information from the control unit), confirming receipt of specific information, augmenting the communication with security, and/or any other operations. Some or all portion of the communication between the control unit 102 may be via a wireless link or wireless links. The wireless link may include a RF link, a near field communication link (NFC), a Bluetooth link (including BLE), a cellular network, an iBeacons link, a WIFI network, a WIFI hotspot and/or any other type(s) of wireless link(s). To facilitate the communication between the control unit 102 and the individual portable media capture devices 104 via wireless link, the device communication component 118 may be configured with wireless configured with one or more wireless protocols, such as, Bluetooth, IEEE 802.11, CDMA/GSM, and/or any other wireless protocols.

The media aggregation component 120 may be configured to receive media from the portable media capture devices. The media aggregation component 120 may receive the captured media through the device communication component 118 via a wireless link or links. A given media received by the media aggregation component 120 may be captured by a portable media capture device 104 in accordance with a capture request. In some implementations, information identifying the capture request by which the media was captured may be received by the media aggregation component 120 along with the captured media. In some implementations, the captured media received by the media aggregation component 120 from the individual portable media capture devices may include metadata information. The metadata information may indicate one or more geolocations where the media was captured, one or more times when the media was captured, one or more identifications identifying the captured media, position information regarding the captured media (e.g., longitude and latitude at which the media was captured), information regarding the capturing functionality that captured the media (e.g., model number of the camera, speed of shutter, exposure level, flashlight on/off, and/or any other information regarding the capturing functionality), social profiles of the users associated with the portable media capture devices 104 that captured the media, news and other social context from the web, weather information, temperature information, and/or any other types of metadata information that may be included in the captured media. In those implementations, the media aggregation component 120 may extract such metadata from the captured media after receiving the captured media from the individual portable media capture devices 104.

In some implementations, the captured media may be received from the individual portable media capture devices 104 directly via a wireless link. For instance, without limitation, in one implementation, the captured media may be received from the individual portable media capture device 104 directly via a Bluetooth link or a wireless network. However, this is not necessarily the only case. In some other implementations, the captured media may be received by the media aggregation component 120 from a network location, e.g., such as a server, to which the individual portable media capture devices 104 transmitted the capture media. For instance, without limitation, in one implementation, the captured media may be first uploaded by the individual portable media capture devices 104 to a server (not depicted in this example); and the server may transfer the captured media to the control unit 102 on a predetermined schedule and/or the control unit 102 via media aggregation component 120 may download the captured media form the server.

In some implementations, as discussed above, receiving the captured media by the media aggregation component 120 may involve determining whether the media requested by the capture requests was received from the corresponding portable media capture devices 104, polling individual portable media capture devices 104 if the media has not been captured, and/or any other operations. For example, without limitation, a capture request determined by the capture request component 114 may instruct a portable media capture device 104 to capture media at time T in coordination with other media capture devices 104. In that example, the media aggregation component 120 may be configured to determine whether media captured by that portable media capture device 104 in accordance with the capture request is received at time T. In the case where it is determined that the captured media has not been received from the portable media capture device 104 at time T, the media aggregation component 120 may poll that portable media capture device for a status of the media requested to be captured until it is received.

Figure 9:
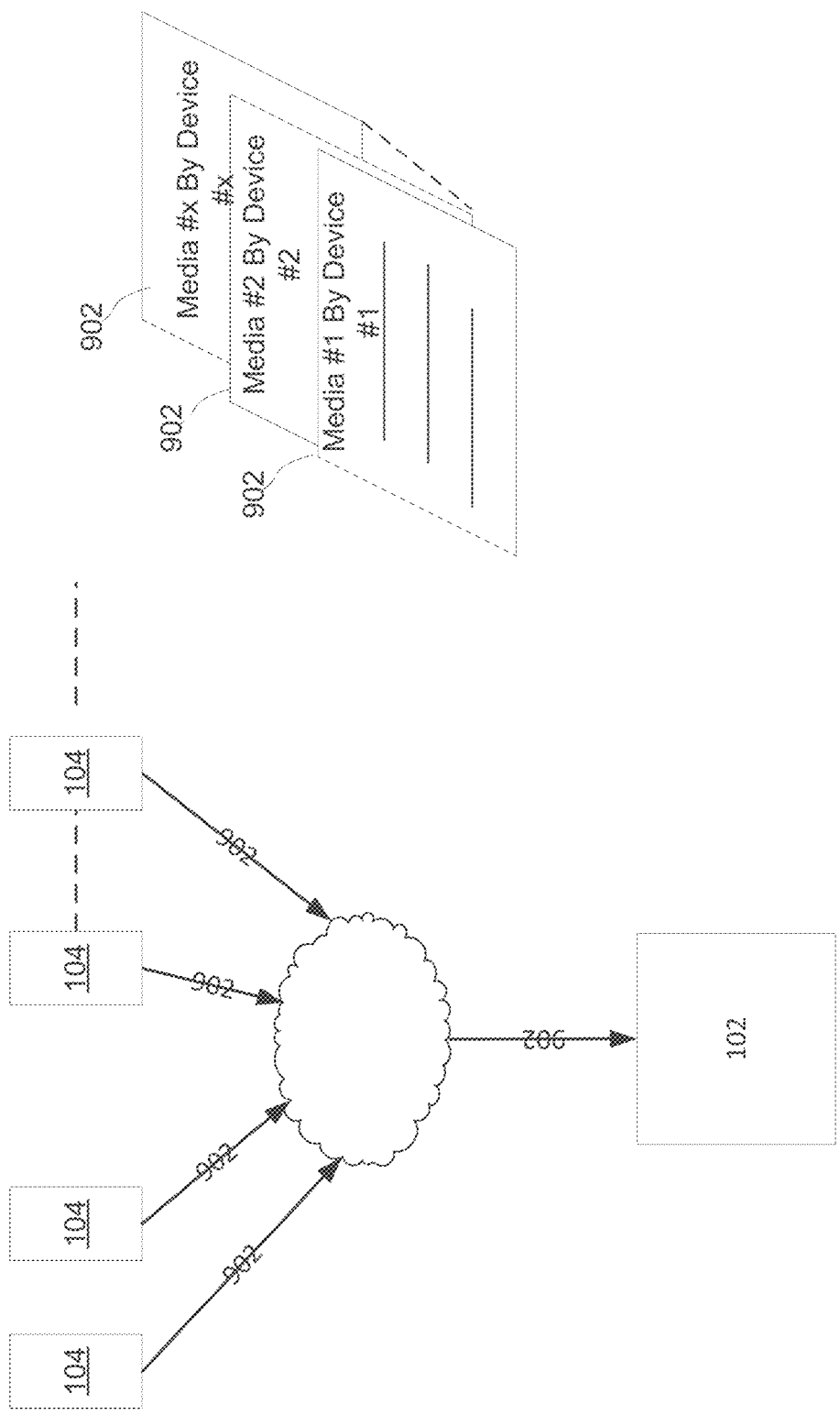
FIG. 9 illustrates one example of receiving captured media from individual portable media capture devices shown in FIG. 1.

FIG. 9 illustrates one example of receiving captured media from individual portable media capture devices shown in FIG. 1. It will be described with reference to FIGS. 1-4. As can be seen from FIG. 9, media 902 captured by individual portable media capture devices 104 in accordance with the capture requests may be received by the control unit 102. As shown, the media 902 may be received via a wireless link or wireless links.

It should be noted that in some implementations, the media aggregation component 120 may be configured to receive information captured by portable media capture devices 104 in accordance with the corresponding capture requests; and in those implementations, the media aggregation component 120 may receive the captured information in fashion(s) similar to it receives the captured media as described herein. The captured information that may be received by the media aggregation component 120 in those implementations may include weather information, stock information, geolocation information, time stamp information, IP address information, social profile information regarding users associated with the portable media capture devices 104, news, multiple feeds from external resources and/or any other type(s) of captured information.

Returning to FIG. 1, after receiving the captured media from the individual portable media capture devices 104, the media aggregation component 120 may be configured to effectuate aggregation of the received captured media. For a set of media captured by the portable media capture devices 104 in accordance with capture requests determined by the capture request component 114, the media aggregation component 120 may aggregate the set of the captured media such that the set of captured media may be accessed by users in an aggregated format. The aggregated captured media may convey a view, a message, a story, an experience, an enhanced quality, and/or any other type(s) perspective(s) to the users. By way of non-limiting example, the media captured by the portable media capture device in coordination with each other may include multiple images and/or video. In that example, the aggregation effectuated by the media aggregation component 120 may include combining the multiple captured images, and/or videos to form a segmented panorama or high resolution images and/or video. To achieve this, the aggregation effectuated by the media aggregation component 120 may involve registering, calibrating, blending the images and/or videos, and/or any other transform processes. The registering process may involve matching features in the set of images and/or videos captured in coordination with the capture requests, searching for alignments that may seamlessly combine the set of images and/or videos based on the features; and/or any other operations. The calibration process may involve calculating adjustments to minimize differences between the set of images and/or videos, minimizing defects such as distortions, exposures and/or any other defects, optimizing the images using geometric algorithms, and/or any other operations. The blending process may involve executing the adjustments calculated by the calibration process, remapping the images and/or the videos for output projection, adjusting color(s), merging the images and/or the video to compensate motion difference, and/or any other operations. Examples of the aggregated format at the end of these processes may include a panoramic view (horizontal or vertical), a fisheye view (including a hemispheric fisheye view), a one-shot lenses view, or any other wide view of a real-world field through the aggregated images and/or video. Other examples of the aggregated format that may be achieved by the media aggregation component 120 may include a blended view for enhanced media quality, a motion view, a 3D view, views for implementing visualization, animation (e.g., animated GIF), views for implementing Augmented Reality and/or any other type(s) of view(s). In some implementations, the aggregation effectuated by the media aggregation component 120 may employ one or more image stitching algorithms.

Figure 10:
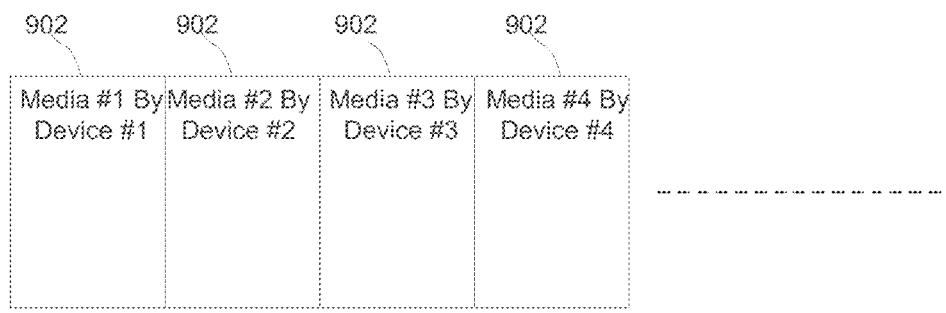
FIG. 10 illustrates one example of aggregating the captured media shown in FIG. 9 for a wide view of a real-world field.

FIG. 10 illustrates one example of aggregating captured media shown in FIG. 9 for a wide view of a real-world field. It will be described with reference to FIG. 1 and FIG. 9. As can be seen from FIG. 10, the captured media 902 shown in FIG. 9 may be aggregated horizontally to form a wide view of a real-world field. For instance, as an illustration, a group of users may be visiting a tourist location; they may be facilitated to take pictures of the scene from their vintage point using their smartphones in coordination with each other by the capture requests determined by a control unit 102 (e.g., a smartphone of one of the users) and the pictures taken by the users in this fashion may be aggregated to form a panoramic view of the scene for access by those users.

Figure 11:
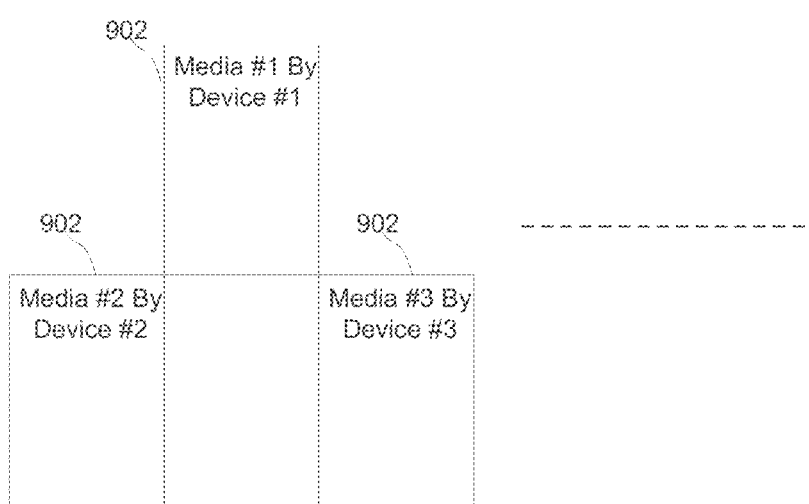
FIG. 11 illustrates one example of aggregating the captured media received as shown in FIG. 9 to form a simple collage.

However, it should be appreciated that the aggregation effectuated by the media aggregation component 120 may not be limited to aggregating the captured media based on features or segments in the captured media. In various implementations, the aggregation effectuated by the media aggregation component 120 may be just about any type of media aggregation as desired. For example, in one implementation, the aggregation effectuated by the media aggregation component 120 may involve aggregating the captured media side by side to form a comparison. In another implementation, the captured media may include audio clips recorded by individual recording devices at different locations, wherein the audio clips may include segments of speeches and/or sounds; and the audio clips may be aggregated as if the speeches and/or sounds were taking place at the same time and in the same space. For instance, friends may be facilitated to sing a different verse from a chorus in coordination with each other (e.g., at different locations) and record the singing in audio clips through their smartphones. The audio clips may be received by the media aggregation component 120 and aggregated as if the friends were singing the chorus at the same time. In another implementation, pictures taken in coordination with each other in accordance with the capture requests may be simply put together randomly to form a collage. FIG. 11 illustrates one example of aggregating the captured media received as shown in FIG. 9 to form a simple collage. Other examples of aggregating media captured by the portable media capture device in coordination with each other are contemplated.

Figure 12:
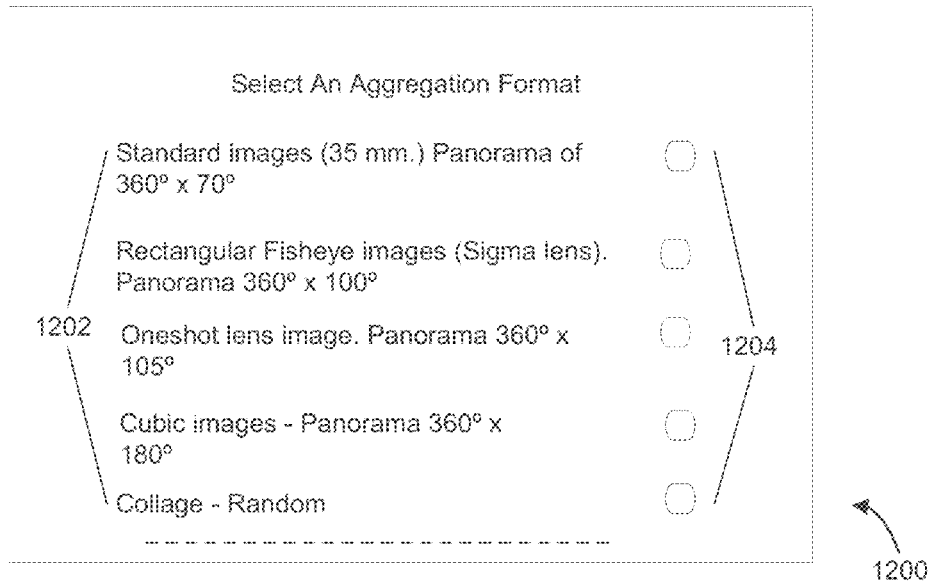
FIG. 12 illustrates one example of an aggregation format selection user interface configured to enable a user to select an aggregation format for aggregating the captured media.

In some implementations, aggregation of the media captured in accordance the capture requests may be configured by the user(s) of the system 100. For example, the user interface component 116 may be configured to provide one or more graphical user interfaces enabling the user(s) of the system 100 to configure the aggregation. The media aggregation component 120 may obtain the user configuration from such graphical user interfaces and augment the actual aggregation with the user configuration. FIG. 12 illustrates one example of an aggregation format selection user interface 1200 configured to enable a user to select an aggregation format for aggregating the captured media. The interface 1200 may be provided by a system similar to or the same as system 100 (illustrated and described herein). As can be seen in FIG. 12, various aggregation formats 1202 may be presented in the user interface 1200. Radio boxes 1204, as shown, may be provided in the user interface 1200 to enable a user to select a desired aggregation format.

Figure 13:
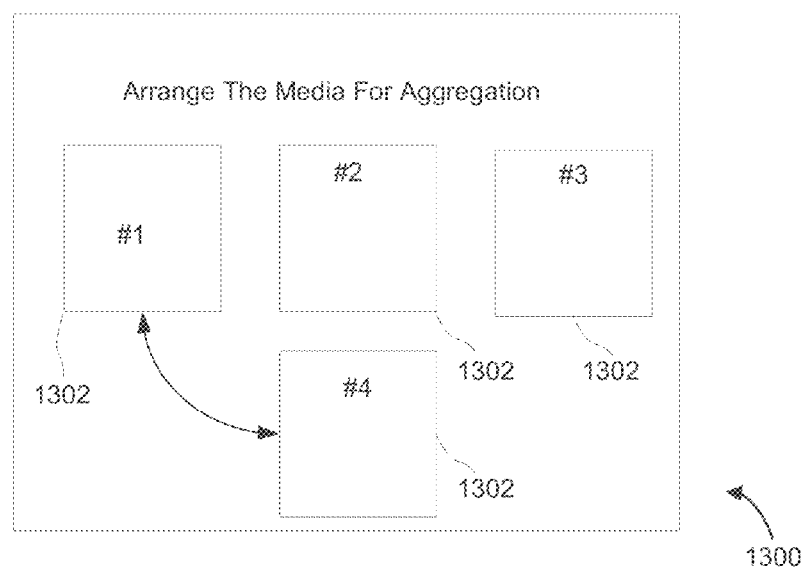
FIG. 13 illustrates one example of an aggregation format selection user interface 1300 configured to enable a user to arrange captured media for aggregation.

In some implementations, the user(s) of system 100 may be enabled to arrange the aggregation of the captured media by specifying positions of the captured media in the aggregated format. For example, the user(s) of system 100 may be facilitated to specify where a particular piece of the captured media should be placed in the aggregated format. In some instances, the user(s) of system 100 may be enabled to do so with a preview window for viewing the individual captured media. FIG. 13 illustrates one example of an aggregation format selection user interface 1300 configured to enable a user to arrange captured media for aggregation. The interface 1300 may be provided by a system similar to or the same as system 100 (illustrated and described herein). As can be seen in FIG. 13, preview windows 1302 may be presented in the user interface 1300 for presenting a preview of the captured media. As also shown, the arrangement of the preview windows in the user interface 1300 may represent how they will be presented in the aggregated format. As illustrated, the user(s) of the system 100 may be enabled to specify positions of the preview windows so that the corresponding captured media may appear at those positions in the aggregated format. As shown in this example, the user(s) of the system 100 switches media #1 (e.g., captured by a device #1) with media #4 (e.g., captured by a device #4 in coordination with capturing of media #1 by device #1) such that media #1 will appear at the position where media #4 currently occupies and media #4 will appear at the position where media #1 currently occupies in the aggregated format.

In some implementations, the media aggregation component 120 may be configured to effectuate processing of the aggregated captured media. The processing of the aggregated captured media may include appending metadata to the aggregate capture media, extracting, storing, categorizing searchable features from the aggregated captured media. The metadata that may be appended to the aggregated captured media may include data for facial recognition, eye color determination, mood determination, time of day determination, number of people in the shot determination, printing material specification, photo booth layout specification, photo paper specification, projection specification, display specification (e.g., for display on multiple displays), and/or any other types of metadata. Features that may be extracted from the aggregated captured media by the processing effectuated by the media aggregation component 120 may include logos, brand names of objects appearing in the media, identification of the objects, colors, time of day, and/or any other extractable features of the aggregated captured media. The processing may involve extracting such features from the aggregated captured media, storing them in data storage (e.g., electronic storage 110 and/or external resources 106), categorizing them by feature type(s), name(s), date and/or any other characteristics for information mining on the aggregated captured media.

It should be understood that the actual processing of the aggregated captured media described above may be performed by the control unit 102, the system 100, and/or the external resources 106. In one implementation, without limitation, the processing is performed by a third party media processing provider.

In some implementations, the media aggregation component 120 may be configured to effectuate aggregation of information captured by the portable media capture devices 104 in accordance with the corresponding capture requests. The information aggregation that may be effectuated by the media aggregation component 120 may include aggregating weather information, stock information, geolocation information, time stamp information, IP address information, social profile information regarding users associated with the portable media capture devices 104, news, multiple feeds from external resources and/or any other type(s) of information. For example, as an illustration, the media aggregation component 120 may receive captured weather information (e.g., temperature) from individual portable media capture devices 104 regarding the weather in a corresponding environment the individual portable media capture devices 104 are in. In that example, the media aggregation component 120 may effectuate aggregation of the received weather information. For instance, the received weather information may be aggregated in a table format side by side to indicate various temperatures in the environments corresponding to the portable media capture devices 104. Other examples of aggregating captured information are contemplated.

The aggregated media access component 122 may be configured to facilitate access to the aggregated captured media. The access facilitated by the aggregated media access component 122 may be on the portable media capture devices 104 that captured the individual media in the aggregated format. By way of illustration, users of the individual portable media capture devices 104 (e.g., smartphones) may be facilitated to view the media captured by the portable media capture devices 104 in an aggregated format (e.g., a panoramic view of a real-world field) from the portable media capture devices 104. This may facilitate a sense of social connection between those users because they contributed to the aggregated captured media.

Facilitating access of the aggregated captured media by the aggregated media access component 122 may involve making the aggregated captured media available to the portable media capture devices 104 via a wireless link and/or a wired link. In some implementations, the aggregated media access component 122 may facilitate such access by storing the aggregated captured media on the electronic storage 110 that is coupled to the control unit 102. In those implementations, the aggregated media access component 122 may make the storage location on the electronic storage 110 available (e.g., share) to the portable media capture devices 104. For instance, without limitation, users of the portable media capture devices 104 may be facilitated to access the aggregated captured media stored on the control unit 102 via a Bluetooth link and/or a wireless network.

In some implementations, the aggregated media access component 122 may facilitate access to the aggregated captured media by storing the aggregated captured media at a network location, such as that provided by external resources 106 shown in FIG. 1. For example, without limitation, the external resources may include a server provided by a social media service provider, a network storage service provider, an Internet service provider, an online game provider, and/or any other type(s) of third party providers. The network storage location on the server, in that example, may then be made available (e.g., shared) to the users of the individual portable media capture devices 104.

In some implementations, the aggregated media access component 122 may be configured to receive information regarding user access of the aggregated captured media. For example, without limitation, information regarding user activities in accessing the aggregated media posted on a social media website may be received by the aggregated media access component 122. This may include receiving information regarding the users who accessed the aggregated captured media (e.g., usernames, region of the access, IP address of the access), up-votes received for the aggregated captured media (e.g., likes), comments made about the aggregated captured media, reposting (e.g., retweeting, sharing, emailing) of the aggregated captured media, downloading of the aggregated captured media, and/or any other information. In some implementations, receiving such information by the aggregated media access component 122 may involve poll the external resources 106 that provide such information on a predetermined schedule configured into the aggregated media access component 122.

The control unit 102, portable media capture devices 104, and/or external resources 106 may be operatively linked via one or more electronic communication links. For example, such electronic communication links may be established, at least in part, via a wireless link. It will be appreciated that this is not intended to be limiting, and that the scope of this disclosure includes implementations in which control unit 102, portable media capture devices 104, and/or external resources 106 may be operatively linked via some other communication media.

A given portable media capture device 104 may include one or more processors configured to execute computer program components. The computer program components may be configured to enable a user to interface with system 100 and/or external resources 106, and/or provide other functionality attributed herein to the control unit 102. By way of non-limiting example, the given portable media capture device 104 may include one or more of a mobile phone, a tablet, a netbook, a laptop, a camera, a camcorder, an audio recorder, and/or any other types of portable devices having one or more media capture functionality.

The external resources 106 may include sources of information, hosts and/or providers of Internet services outside of system 100, external entities participating with system 100, and/or other resources. In some implementations, some or all of the functionality attributed herein to external resources 106 may be provided by resources included in system 100. Examples of external resources 106 may include social media sites (e.g., Facebook™, Twitter™, Weibo™ and any other social media sites), network storage (e.g., Dropbox™, Google Drive™ and any other network storage), an Internet service account (e.g., account provided by an ISP), an online game account (e.g., account provided by a game provider), and/or any other type(s) of external resources.

The control unit 102 may include electronic storage 110, one or more processors 108, and/or other components. The control unit 102 may include hardware to enable the exchange of information via a wireless link. Illustration of control unit 102 in FIG. 1 is not intended to be limiting. The control unit 102 may include a plurality of hardware, software, and/or firmware components operating together to provide the functionality attributed herein to control unit 102. Examples of the control unit 102 may include, but not limited to, a smartphone, a feature phone, a tablet, a netbook, a laptop, a desktop computer, a server, a camera, a camcorder, and/or any other type(s) of devices or apparatus.

Electronic storage 110 may comprise electronic storage media that electronically stores information. The electronic storage media of electronic storage 110 may include one or both of system storage that is provided integrally (i.e., substantially non-removable) with control unit 102 and/or removable storage that is removably connectable to control unit 102 via, for example, a port (e.g., a USB port, a FireWire port, etc.) a memory card (e.g., microSD™), or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from control unit 102, information received from client computing platforms 104, and/or other information that enables control unit 102 to function as described herein.

Processor(s) 108 is configured to provide information processing capabilities in control unit 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122. Processor 108 may be configured to execute components 112, 114, 116, 118, 120, 122 by software, hardware, firmware, some combination of software, hardware, and/or firmware, and/or other mechanisms for configuring processing capabilities on processor 108.

It should be appreciated that, although components 112, 114, 116, 118, 120, and 122 are illustrated in FIG. 1 as being co-located within a single processing unit, in implementations in which processor 108 includes multiple processing units, one or more of components 112, 114, 116, 118, 120, and 122 may be located remotely from the other components. The description of the functionality provided by the different components 112, 114, 116, 118, 120, and 122 described below is for illustrative purposes, and is not intended to be limiting, as any of components 112, 114, 116, 118, 120, and 122 may provide more or less functionality than is described. For example, one or more of components 112, 114, 116, 118, 120, and 122 may be eliminated and some or all of its functionality may be provided by other ones of components 112, 114, 116, 118, 120, and 122. As another example, processor 108 may be configured to execute one or more additional components that may perform some or all of the functionality attributed below to one of components 112, 114, 116, 118, 120, and 122.

Figure 14:
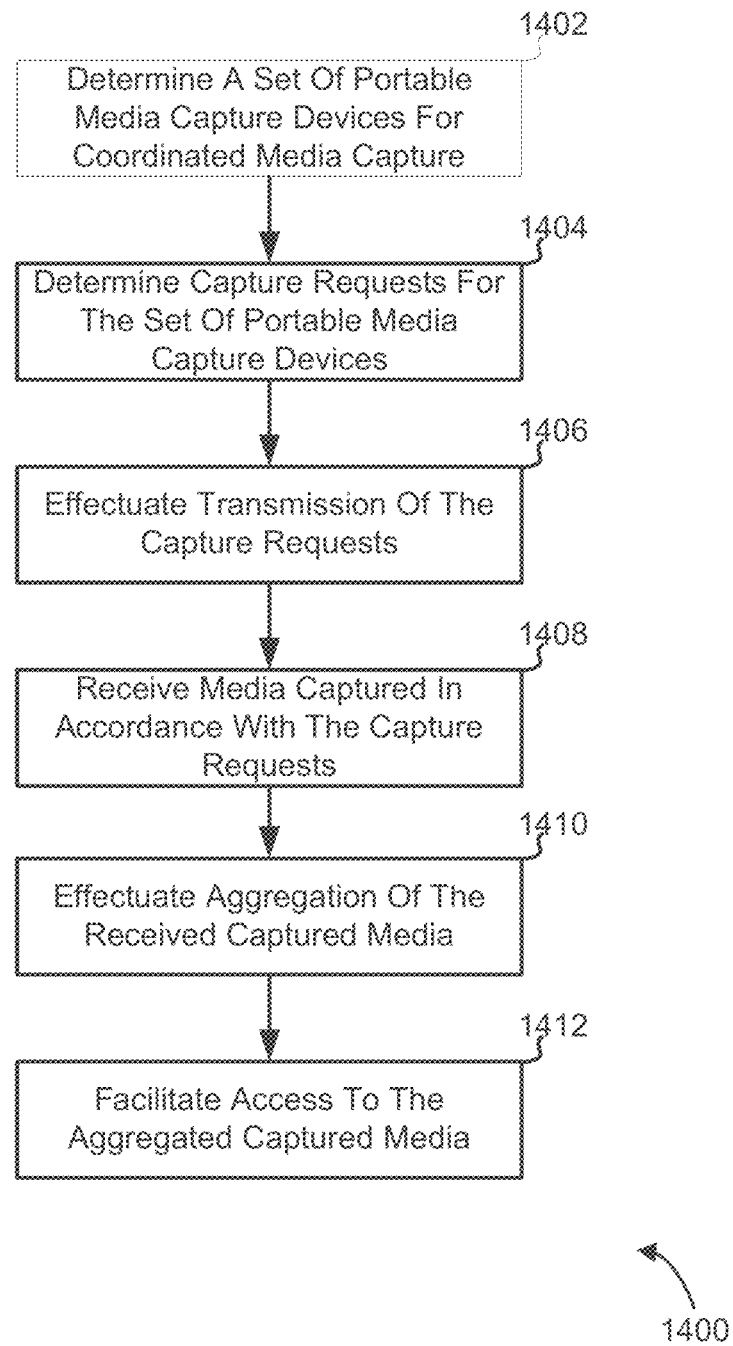
FIG. 14 illustrates one example of a method for facilitating coordinated media capturing and aggregation in accordance with the disclosure.

FIG. 14 illustrates one example of method 1400 for facilitating coordinated media capturing and aggregation in accordance with the disclosure. The operations of method 1400 presented below are intended to be illustrative. In some embodiments, method 1400 may be accomplished with one or more additional operations not described, and/or without one or more of the operations discussed. Additionally, the order in which the operations of method 1400 illustrated in FIG. 14 and described below is not intended to be limiting.

In some embodiments, method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

At an operation 1402, a set of portable media capture devices may be determined for coordinated media capture. Determination by operation 1402 may include communicating with individual portable media capture devices, acquiring a status regarding the individual portable media capture devices, determining whether the individual portable media capture device may be included in a set for the coordinated media capturing, and/or any other operations. In some implementations, operation 1402 may be performed by a device determination component the same as or similar to device determination component 112 (shown in FIG. 1 and described herein).

At an operation 1404, capture requests may be determined for the set of portable media capture devices determined in operation 1402. The capture requests determined in operation 1404 may be used by the individual portable media capture devices to start capturing media in coordination with each other. An individual capture request may comprise configuration information instructing a corresponding portable media capture device to start capturing media in coordination with other portable media capture devices in the set. In some implementations, the configuration information in the individual capture request may indicate various configuration of the media capture functionality provided by the corresponding portable media capture device. For example, in some implementations, the capture requests determined in operation 1404 may specify that the set of portable media capture devices should start the media capturing at the same time. In some implementations, the capture requests determined in operation 1404 may specify that the set of portable media capture devices should start the portable media capture devices sequentially or quasi-sequentially. In some implementations, operation 1404 may be performed by a capture request component the same as or similar to capture request component 114 (shown in FIG. 1 and described herein).

At operation 1406, transmission of the capture requests determined in operation 1404 to the set of portable media capture devices determined in operation 1402 may be effectuated. In some implementations, operation 1406 may be performed by a capture request component the same as or similar to capture request component 114 (shown in FIG. 1 and described herein).

At an operation 1408, media captured in accordance with the capture requests determined in operation 1404 may be received. In some implementations, the captured media may be received from the individual portable media capture devices directly via a wireless link. In some other implementations, the captured media may be received by the media aggregation component from a network location, e.g., such as a server. In some implementations, receiving the captured media in operation 1408 may involve determining whether the media requested by the capture requests has been received from the corresponding portable media capture devices, polling individual portable media capture devices if the media has not been captured, and/or any other operations. In some implementations, operation 1408 may be performed by a media aggregation component the same as or similar to media aggregation component 120 (shown in FIG. 1 and described herein).

At an operation 1410, aggregation of the captured media received in operation 1408 may be effectuated. In various implementations, the aggregation effectuated in operation 1410 may be just about any type of media aggregation as however desired. The aggregation effectuated in operation 1410 may involve registering, calibrating, blending the images and/or videos, and/or any other transform processes. Examples of the aggregated format at the end of these processes may include a panoramic view (horizontal or vertical), a fisheye view (including a hemispheric fisheye view), a one-shot lenses view, or any other wide view of a real-world field through the aggregated images and/or video. Other examples of the aggregated format that may be achieved by the media aggregation component may include a motion view, a 3D view, and/or any other type(s) of view(s). In some implementations, audio clips recorded by individual recording devices at different locations may be aggregated in operation 1410 as if the speeches and/or sounds were taking place at the same time and in the same space. In some implementations, operation 1410 may be performed by media aggregation components the same as or similar to media aggregation component 120 (shown in FIG. 1 and described herein).

At an operation 1412, access to the aggregated captured media may be facilitated. The access facilitated in operation 1412 may be on the portable media capture devices that captured the individual media in the aggregated format. Facilitating such access by the aggregated media access component may involve making the aggregated captured media available to the portable media capture devices via a wireless link and/or a wired link. In some implementations, operation 1412 may be performed by aggregated media access component the same as or similar to aggregated media access component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating coordinated image capturing and aggregation, the system comprising:
   one or more physical processors configured by machine-readable instructions to:
      determine sets of capture requests, individual capture requests being configured to start capturing functionality on portable media capture devices in coordination with other portable media capture devices, the capture requests including a first set of capture requests for a first set of portable media capture devices, the capture requests in the first set of capture requests being configured to start capturing functionality provided by individual ones of the first set of portable media capture devices in coordination with each other, the first set of capture requests including a first capture request configured to start capturing functionality provided by a first portable media capture device in the first set of portable media capture devices;
      effectuate transmission of the capture requests to the portable media capture devices via a network such that transmission of the first set of capture requests to the corresponding portable media capture devices in the first set of portable media capture devices is effectuated;
      receive, via the network, captured images from the portable media capture devices and information associated with the captured images, the received captured images having been captured by the portable media capture devices in accordance with the capture requests, and the information associated with the captured images indicating the individual capture requests or sets of capture requests that caused the individual captured images to be captured;
      store, on electronic storage media remote from the portable media captured devices, (i) the received captured images, and (ii) the information associated with the captured images,
         wherein the received captured images include a first captured image captured by the first portable media capture device in accordance with the first capture request, and the information associated with the first captured image indicates the first captured image was caused to be captured by the first capture request;
      organize the received captured images, based on the information associated with the captured images, into sets of captured images caused to be captured by common sets of capture requests such that the first captured image is included in a first set of captured images caused to be captured by the first set of capture requests;
receive requests, from the portable media capture devices, to transmit the organized sets of captured images; and
transmit, in response to the received requests, the organized sets of captured images to the portable media capture devices such that in response to a first request from the first portable media capture device, the first set of captured images is transmitted to the first portable media capture device for coordinated presentation on the first portable media captured device.

2. The system of claim 1, wherein the first portable media capture device includes a smartphone, a tablet, a laptop, a portable camera, a portable camcorder, and/or a portable audio recorder.

3. The system of claim 1, wherein the first set of capture requests are configured such that the capturing functionality provided by the individual ones of the first set of portable media capture devices is started simultaneously or near simultaneously.

4. The system of claim 1, wherein the first set of capture requests are configured such that the capturing functionality provided by individual ones of the first set of portable media capture devices is started sequentially or near sequentially.

5. The system of claim 1, wherein the first set of captured images includes a panoramic, three dimensional, motion, and/or a corroborated view.

6. The system of claim 1, wherein transmitting the first set of captured images includes determining and/or appending metadata information regarding the first set of captured images to facilitate information mining.

7. The system of claim 1, wherein the first set of captured images includes a collage.

8. The system of claim 1, wherein the one or more physical processors are further configured by machine-readable instructions to provide one or more graphical user interfaces to enable a user to select which portable media capture devices to be included in the first set of portable media capture devices.

9. The system of claim 1, wherein the one or more physical processors are further configured by machine-readable instructions to provide one or more graphical user interfaces to enable a user to configure the first set of capture requests for the first set of portable media capture devices.

10. The system of claim 1, wherein the one or more physical processors are further configured by machine-readable instructions to provide one or more graphical user interfaces to enable a user to notify users associated with the individual ones of the first set of portable media capture devices to prepare for image capture in coordination with each other.

11. The system of claim 1, wherein the one or more physical processors are further configured by machine-readable instructions to provide one or more graphical user interfaces to enable a user to control one or more aspects of capturing functionality provided by the individual ones of the first set of portable media capture devices.

12. The system of claim 11, wherein one or more aspects of the capturing functionality provided by the individual ones of the first set of portable media capture devices include a zoom level, a focus level, a capture angle, a shooting mode, a capture quality, and/or a volume level.

13. The system of claim 1, wherein the one or more physical processors are further configured by machine-readable instructions to provide one or more graphical user interfaces to enable a user to indicate an arrangement of the images captured by the individual ones of the first set of portable media capture devices in accordance with the first set of capture requests.

14. The system of claim 1, wherein one or more physical processors are further configured by machine-readable instructions to provide one or more graphical user interfaces to select an aggregation format for aggregating the images captured by the individual ones of the first set of portable media capture devices in accordance with the first set of capture requests.

15. A method for facilitating coordinated image capturing and aggregation, the method being implemented in one or more physical processors configured to execute computer programs, the method comprising:
determining sets of capture requests, individual capture requests being configured to start capturing functionality on portable media capture devices in coordination with other portable media capture devices, the capture requests including a first set of capture requests for a first set of portable media capture devices, the capture requests in the first set of capture requests being configured to start capturing functionality provided by individual ones of the first set of portable media capture devices in coordination with each other, the first set of capture requests including a first capture request configured to start capturing functionality provided by a first portable media capture device in the first set of portable media capture devices;
effectuating transmission of the capture requests to the portable media capture devices via a network such that transmission of the first set of capture requests to the corresponding portable media capture devices in the first set of portable media capture devices is effectuated;
receiving, via the network, captured images from the portable media capture devices and information associated with the captured images, the received captured images having been captured by the portable media capture devices in accordance with the capture requests, and the information associated with the captured images indicating the individual capture requests or sets of capture requests that caused the individual captured images to be captured;
storing, on electronic storage media remote from the portable media captured devices, (i) the received captured images, and (ii) the information associated with the captured images,
wherein the received captured images include a first captured image captured by the first portable media capture device in accordance with the first capture request, and the information associated with the first captured image indicates the first captured image was caused to be captured by the first capture request;
organizing the received captured images, based on the information associated with the captured images, into sets of captured images caused to be captured by common sets of capture requests such that the first captured image is included in a first set of captured images caused to be captured by the first set of capture requests;
receiving requests, from the portable media capture devices, to transmit the organized sets of captured images; and
transmitting, in response to the received requests, the organized sets of captured images to the portable media capture devices such that in response to a first request from the first portable media capture device, the first set of captured images is transmitted to the first portable media capture device for coordinated presentation on the first portable media captured device.

16. The method of claim 15, wherein the first portable media capture device is a smartphone, a tablet, a laptop, a portable camera, a portable camcorder, or a portable audio recorder.

17. The method of claim 15, wherein the first set of capture requests are configured such that the capturing functionality provided by the individual ones of the first set of portable media capture devices is started simultaneously or near simultaneously.

18. The method of claim 15, wherein the first set of capture requests are configured such that the capturing functionality provided by individual ones of the first set of portable media capture devices is started sequentially or near sequentially.

19. The method of claim 15, wherein the first set of captured images includes a panoramic, three dimensional, motion, and/or a corroborated view.

20. The method of claim 15, wherein the first set of captured images includes a collage.

21. The method of claim 15, wherein facilitating access to the first set of captured images includes determining and/or appending metadata information regarding the first set of captured images to facilitate information mining.

22. The method of claim 15, further comprising providing one or more graphical user interfaces to enable a user to select which portable media capture devices to be included in the first set of portable media capture devices.

23. The method of claim 15, further comprising providing one or more graphical user interfaces to enable a user to configure the first set of capture requests for the first set of portable media capture devices.

24. The method of claim 15, further comprising providing one or more graphical user interfaces to enable a user to notify users associated with the individual ones of the first set of portable media capture devices to prepare for image capture in coordination with each other.

25. The method of claim 15, further comprising providing one or more graphical user interfaces to enable a user to control one or more aspects of capturing functionality provided by the individual ones of the first set of portable media capture devices.

26. The method of claim 25, the one or more aspects of the capturing functionality provided by the individual ones of the first set of portable media capture devices include a zoom level, a focus level, a capture angle, a shooting mode, a capture quality, and/or a volume level.

27. The method of claim 15, further comprising providing one or more graphical user interfaces to enable a user to indicate an arrangement of the of the images captured by the individual ones of the first set of portable media capture devices in accordance with the first set of capture requests.

28. The method of claim 15, further comprising providing one or more graphical user interfaces to enable a user to select an aggregation format for aggregating the images captured by the individual ones of the first set of portable media capture devices in accordance with the first set of capture requests.

* * * * *